United States Patent
Barton

(10) Patent No.: US 11,703,395 B2
(45) Date of Patent: Jul. 18, 2023

(54) MEASUREMENT DEVICE FOR MEASURING A TEMPERATURE

(71) Applicant: Endress+Hauser Wetzer GmbH+Co. KG, Nesselwang (DE)

(72) Inventor: Shane Barton, Charlotte, NC (US)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 339 days.

(21) Appl. No.: 17/139,194

(22) Filed: Dec. 31, 2020

(65) Prior Publication Data

US 2022/0205848 A1   Jun. 30, 2022

(51) Int. Cl.
| | |
|---|---|
| G01K 7/16 | (2006.01) |
| G01K 1/12 | (2006.01) |
| G01K 1/14 | (2021.01) |
| G01K 1/16 | (2006.01) |
| G01K 7/02 | (2021.01) |

(52) U.S. Cl.
CPC ............... *G01K 7/16* (2013.01); *G01K 1/12* (2013.01); *G01K 1/14* (2013.01); *G01K 1/16* (2013.01); *G01K 7/02* (2013.01)

(58) Field of Classification Search
USPC ........................................ 374/208, 179, 183
See application file for complete search history.

(56) References Cited

U.S. PATENT DOCUMENTS

| | | | |
|---|---|---|---|
| 5,454,641 A * | 10/1995 | Parker | G01K 1/20 374/E1.019 |
| 2014/0269820 A1 | 9/2014 | Perrault et al. | |
| 2017/0328782 A1 | 11/2017 | Wolf et al. | |
| 2020/0149974 A1 | 5/2020 | Hand et al. | |
| 2020/0225096 A1* | 7/2020 | Ude | G01K 1/12 |

FOREIGN PATENT DOCUMENTS

| | | | |
|---|---|---|---|
| EP | 0692704 A1 * | 1/1996 | |
| JP | 2008232620 A * | 10/2008 | |

* cited by examiner

*Primary Examiner* — Mirellys Jagan
(74) *Attorney, Agent, or Firm* — Christopher R. Powers; Endress+Hauser (USA) Holding, Inc.

(57) ABSTRACT

A measurement device for measuring a temperature prevailing inside a container is disclosed. The measurement device comprises: a process connector including a connector body and a fastener configured to be mounted onto a corresponding counterpart surrounding an opening of the container; a measurement unit secured in an opening of the process connector such that a front surface of the measurement unit is facing into the container when the measurement device is mounted on the container; the measurement unit including or consisting of: a heat pipe and a temperature sensor; the heat pipe having two thermally conductive interfaces including a front interface exposable to the temperature to be measured and a second interface in thermal contact with the temperature sensor; and a thermal insulation surrounding the heat pipe and the temperature sensor.

19 Claims, 4 Drawing Sheets

MEASUREMENT DEVICE FOR MEASURING A TEMPERATURE

TECHNICAL FIELD

The present disclosure relates to a measurement device for measuring a temperature prevailing inside a container via a process connector for mounting the measurement device on the container.

BACKGROUND

Measurement devices for measuring a temperature inside a container, e.g., a process temperature prevailing inside the container, a temperature of a medium located inside the container or a temperature of a medium flowing through the container, are used in a large variety of different applications, e.g., in industrial applications, in biotechnological applications as well as in laboratories. Measurement results provided by these measurement devices are, e.g., employed to monitor, to regulate and/or to control a process performed at the measurement site and/or to compensate a temperature dependency of a measurement of another variable measured.

In many applications a high measurement accuracy, as well as short response times of the measurement results provided by the measurement device to changes in time of the temperature measured inside the container are desired or required.

Conventional measurement devices for measuring a temperature inside a container available for this purpose include a process connector for mounting the measurement device on the container and a temperature sensor.

To achieve a high measurement accuracy, as well as short response times, the temperature sensor of these measurement devices is commonly located in a tip region of an elongated probe extending into the container when the measurement device is installed on the container. This provides the advantage that the temperature sensor is in close thermal contact to the temperature prevailing inside the container and that the temperature sensor is separated from the process connector and other objects having an outside surface exposed to an ambient temperature prevailing outside the container.

Insertion probes do however constitute an obstacle extending into the container. Consequently, depending on the application, the probe may make it more difficult to clean the container. As an example, the use of scrapers to clean inside surfaces of containers is very difficult or even impossible in the presence of a probe extending into the container. Further, when the container is a pipe or another vessel employed to transport the medium from one location to another, a flow of the medium through the container may be adversely effected by the probe extending into the container.

In principle both problems could be overcome by designing a measurement device without a probe or other components that extend into the container when the measurement device is installed. However, this would require for the temperature sensor to be located outside the container in a position where it would be in very close proximity to the process connector required for mounting the measurement device on the container. The process connector has an outside surface exposed to ambient conditions including an ambient temperature prevailing outside the container. Thus, even in applications where a temperature of the process connector is driven by the temperature inside the container, the exposure of the process connector to the ambient temperature causes a temperature difference between the temperature of the process connector and the temperature to be measured. In addition, due to the comparatively large thermal mass of the process connector there will be significant time delay between a change in time of the temperature to be measured and a corresponding change of the temperature of the process connector.

As a result, any non-negligible temperature difference between the temperature to be measured prevailing inside the container and the temperature of the process connector will cause a transfer of thermal energy between the process connector and the temperature sensor, which in turn changes the temperature that the temperature sensor is exposed to. Correspondingly, a measurement of the temperature inside the container performed with the temperature sensor located outside the container will suffer from a measurement error that changes in time and in magnitude according to the ambient conditions the measurement device is exposed to.

Even if the ambient temperature could be kept constant, temperature differences between the temperature inside the container and the temperature of the process connector caused by the time delay between changes of the temperature to be measured and the corresponding changes of the temperature of the process connector will cause a transfer of thermal energy to or from the temperature sensor. This time delayed transfer of thermal energy leads to a corresponding increase of the response time of the measurement results determined by the measurement device to changes of the temperature inside the container.

Accordingly, there remains a need for further contributions in this area of technology. For example, there is a need for a measurement device for measuring a temperature inside a container providing accurate measurement results and/or having a short response time without requiring any device component of the device to extend into the container during the measurement.

SUMMARY

The present disclosure includes a measurement device for measuring a temperature prevailing inside a container, the measurement device comprising:

a process connector including a connector body and a fastener embodied to be mounted onto a corresponding counterpart surrounding an opening of the container;

a measurement unit secured in an opening of the process connector such that a front surface of the measurement unit is facing into the container when the measurement device is mounted on the container, wherein the measurement unit includes a heat pipe and a temperature sensor, the heat pipe having two thermally conductive interfaces including a front interface exposable to the temperature to be measured and a second interface in thermal contact with the temperature sensor; and a thermal insulation surrounding the heat pipe and the temperature sensor.

The measurement device of the present disclosure provides the advantage that the temperature sensor is exposed to the temperature to be measured via the heat pipe and that both the temperature sensor and the heat pipe are protected by the thermal insulation against adverse effects of temperature differences between the temperature of the process connector and the temperature to be measured.

Due to the operating principle of heat pipes of transferring heat using phase transitions of a fluid enclosed in the heat pipe in form of a liquid under partial pressure, the heat pipe effectively provides an isothermal connection exposing the temperature sensor in thermal contact with the second interface to the temperature to be measured to which the front interface is exposed.

Another advantage is that a thermal conductivity of heat pipes is commonly one or more orders of magnitude larger than a thermal conductivity of most thermally conductive materials, e.g., metals, and several orders of magnitude larger than the thermal conductivity of thermally insulating materials. Thus, depending on the thermal insulation applied, the thermal conductivity of the heat pipe can be upwards of a million times larger than the thermal conductivity of the thermal insulator. The large thermal conductivity provides the advantage that a time delay between a change of the temperature to be measured prevailing on the outside of the front interface and a corresponding change of the temperature of the second interface the temperature sensor is exposed to is extremely short.

The thermal insulation surrounding the heat pipe and the temperature sensor provides the advantage that it thermally insulates the temperature sensor from the ambient conditions and from the process connector. This provides the advantage that a transfer of thermal energy to and from the temperature sensor is essentially limited to thermal energy transferred via the heat pipe.

Even if a small amount of heat were exchanged to and from the temperature sensor through the thermal insulation, e.g., due to non-ideal insulation properties of the insulation, the extremely large thermal conductivity of the heat pipe exceeding the thermal conductivity of the thermal insulator by several orders of magnitude provides the advantage that any effect this heat exchange may have on the temperature that the temperature sensor is exposed to is almost instantly compensated by a corresponding heat flux through the heat pipe keeping the temperature of the second interface at approximately the same temperature as the front interface.

In consequence, the measurement device has a very high measurement accuracy and a very short response time to changes of the temperature to be measured, and adverse effects of temperature differences between the temperature of the process connector and the temperature to be measured on the measurement accuracy are essentially eliminated.

In addition, due to the combination of the heat pipe, the thermal insulation and the position of the temperature sensor on the second interface, a probe or another device component extending into the container when the measurement device is mounted on the container is not required to expose the temperature sensor to the temperature to be measured within the container directly. This provides the advantage that none of the device components of the measurement device extend into the container during measurement. In consequence, the container can be easily cleaned and a flow of a medium flowing through the container is unaffected by the measurement device.

In at least one embodiment, the heat pipe includes a wicking structure covering an inside surface of the heat pipe and is filled with a fluid given by a liquid under partial pressure.

In an embodiment, the heat pipe includes a tube made of a thermally conductive material, a metal, copper, steel, a nickel alloy, aluminum or titanium, and the front interface and the second interface are located on opposite ends of the tube or are each defined by one of two end walls of the tube located on opposite ends of the tube.

In an embodiment of such an embodiment: the fluid is or includes: pentane, water, ammonia, alcohol, water, helium, nitrogen, carbon dioxide, bismuth, mercury, sodium, a sodium alloy, sodium potassium, indium, an eutectic gallium-indium-tin alloy, a fluid including a liquified gas, a fluid including a molten metal or a fluid including a liquid metal alloy; and/or the wicking structure is or includes a sponge, a mesh, a capillary structure, sintered metal fibers or a structure including grooves or machined grooves.

In a further embodiment, the measurement unit is flush mounted inside the opening in the connector body such that the front surface of the measurement unit is flush with a front surface of the connector body of the process connector surrounding it.

In a still further embodiment, the thermal insulation includes a thermally insulating material, a mineral oxide, a polymer, an aerogel, a microporous silica gel, a microporous glass, a zeolite, an insulating foam or an insulating foam formed by injecting a foam pre-product, the foam pre-product including a liquid stage blowing agent and a liquid polymer or the foam pre-product including isocyanate, water and polyurethane, and by letting the foam pre-product expand to form the foam.

In another embodiment, the thermal insulation includes a vacuum chamber surrounding the heat pipe and the temperature sensor such that only the front interface of the heat pipe is exposed to an outside of the vacuum chamber, or the heat pipe is flush mounted inside a vacuum chamber such that an outside surface of the front interface of the heat pipe is flush with a front surface of a section of a chamber wall of the vacuum chamber surrounding the front interface.

In such an embodiment, the measurement device additionally may comprise a thermal insulator configured to provide a thermal insulation between a chamber wall surrounding the vacuum chamber and the process connector, wherein the thermal insulator includes or is made of a thermally insulating material, an aerogel, a microporous silica gel, a microporous glass, a zeolite, an insulating foam or an insulating foam formed by injecting a foam pre-product, the foam pre-product including a liquid stage blowing agent and a liquid polymer or the foam pre-product including isocyanate, water and polyurethane, and by letting the foam pre-product expand to form the foam, such that the thermal insulator surrounds the chamber wall of the vacuum chamber.

In certain embodiments, the measurement device additionally comprises a membrane that covers a front surface of the thermal insulation facing into the container, when the measurement device is mounted on the container, or the front surface of the measurement unit, the front surface of the thermal insulation and a front surface of the connector body.

In an such an embodiment the membrane is made of a thermally conductive material, a metal, a stainless steel, titanium, a nickel-based alloy or tantalum; is a membrane or a metal membrane having a coating or a corrosion resistant coating on its outside surface; and/or has a thickness smaller or equal to 2 mm or a thickness of 0.1 mm to 2 mm.

In further embodiments, the measurement device comprises a releasably connected cover covering an opening of the measurement device such, that at least one of: the temperature sensor, the heat pipe and the measurement unit is exchangeable through the opening of the measurement device.

In such an embodiment, the thermal insulation surrounding the heat pipe and the temperature sensor includes a first insulation surrounding the heat pipe and a separate second insulation surrounding the temperature sensor, and the measurement device includes a detachably mounted module including the cover, the temperature sensor and the second insulation.

In such an embodiment a layer of a thermal paste is located between the temperature sensor and the second interface of the heat pipe, and the layer is a layer of thermally conductive paste, a layer of an electrically insulating thermally conductive paste or a layer of a paste including or made of a resin, an epoxy, a silicon-based material or a silicon containing at least one thermally conductive filler, a metal powder, a metal oxide or a metal nitride.

In another embodiment, the measurement device further comprises a detachably mounted module including the cover and the measurement unit.

In such an embodiment, the measurement device further comprises at least one of: a membrane connected to the process connector such that the membrane covers a front surface of the measurement unit, a front surface of the thermal insulation and a front surface of the connector body; a layer of thermal paste located between the membrane and the front interface of the heat pipe, wherein the layer is a layer of thermally conductive paste, a layer of an electrically insulating thermally conductive paste or a layer of a paste including or made of: a resin, an epoxy, a silicon based material or a silicon containing at least one thermally conductive filler, a metal powder, a metal oxide or a metal nitride; an outer thermal insulation surrounding an inner thermal insulation, wherein the outer thermal insulation is located inside the connector body and wherein the inner thermal insulation is given by the thermal insulation surrounding the heat pipe and the temperature sensor; and a mechanical structure located in an area of an interior of the connector body surrounding the measurement unit, wherein the mechanical structure includes a thermally insulating material, a metal having a low thermal conductivity, a ceramic or a rigid plastic, and wherein the mechanical structure is: configured to mechanically support at least one of the membrane and a shape of the outer thermal insulation; and/or includes a tube and elongated extensions distributed along an outer circumference of the tube, wherein each extension extends from the tube to an inside surface of the connector body.

In another embodiment, the temperature sensor is a sensor including or consisting of at least one thermoelectric converter, at least one thermocouple or at least one resistance temperature detector, and/or the temperature sensor is connected to a sensor electronics, to a sensor electronics located outside the thermal insulation or a sensor electronics located outside the process connector, wherein the sensor electronic is configured to determined and to provide a measurement result of the temperature measured by temperature sensor.

In another embodiment, a front surface of the fastener extends in line (e.g., flush) with a front surface of the connector body, the connector body protrudes in front of a front surface of the fastener, or the connector body protrudes in front of a front surface of the fastener such that the front surface of the connector body is in line (e.g., flush) with an inside wall surface of the container when the measurement device is mounted on the container.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
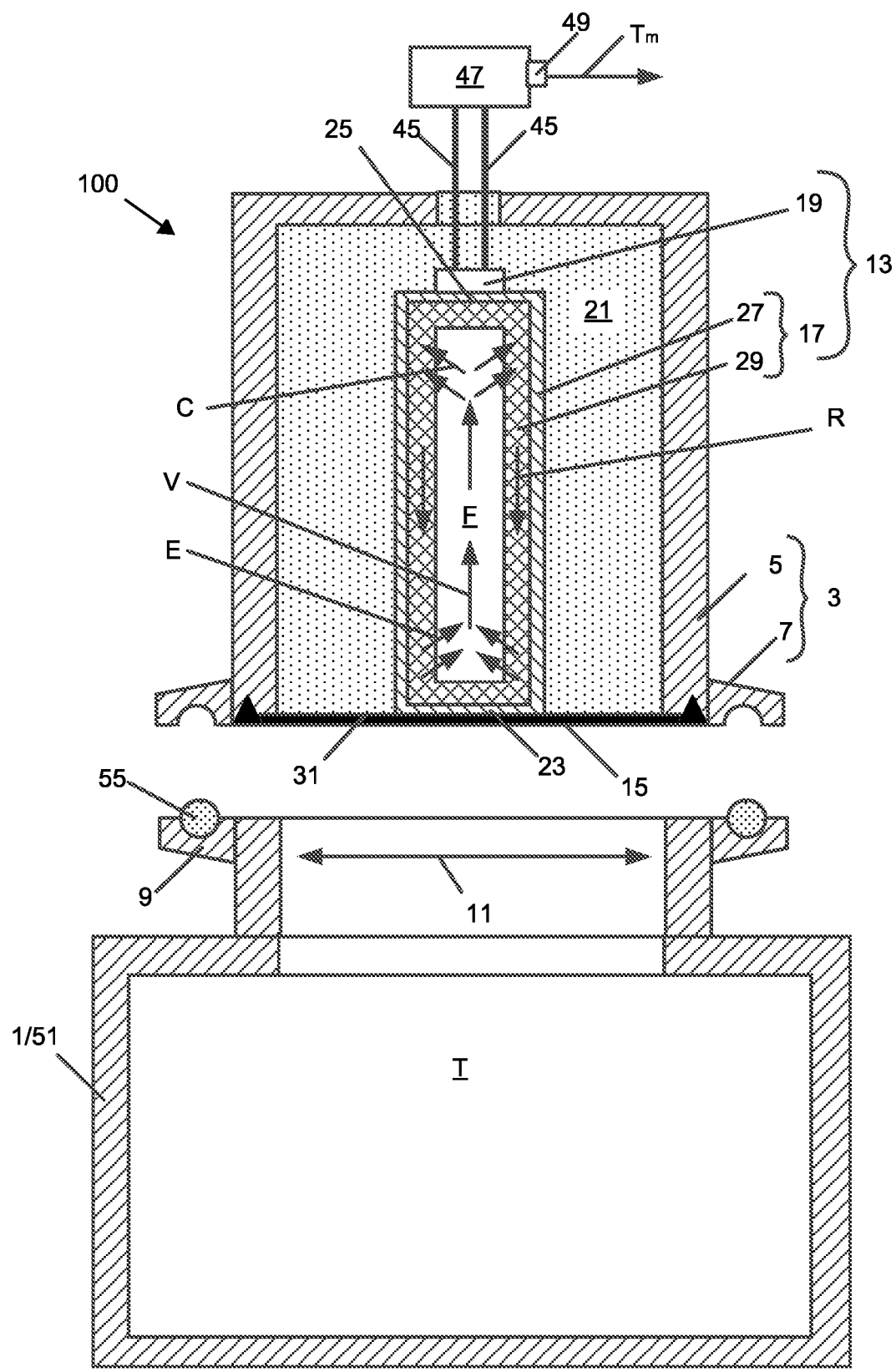
FIG. 1 shows a measurement device of the present disclosure.

The present disclosure includes a measurement device 100 for measuring a temperature T prevailing inside a container 1. An example of the measurement device 100 and an example of the container 1 are shown in FIG. 1.

The container 1 can be any type of vessel having an interior, e.g., a tank, a pipe or another type of open or closed vessel. Depending on the type of container 1 and the application in which the measurement device 100 is employed, the temperature T to be measured is, e.g., a process temperature prevailing inside the container 1, a temperature of a medium, e.g., a liquid or a gas, located inside the container 1, or a temperature of a medium, e.g., a liquid or a gas, flowing through the container, e.g., through a pipe or another type of vessel.

The measurement device 100 includes a process connector 3 for mounting the measurement device on the container 1. The process connector 3 includes a connector body 5, e.g., the cylindrical connector body 5 shown in FIG. 1, and a fastener 7, e.g., the fastener 7 surrounding the connector body 5 shown in FIG. 1. By means of the fastener 7 the process connector 3 is configured to be mounted onto a corresponding counterpart 9 surrounding an opening 11 of the container 1. The fastener 5 is, e.g., configured as an individual part mounted or welded onto the connector body 5 of the process connector 3 or configured as an integral part of the process connector 3. In certain embodiments, the process connector 3 is made of a metal, e.g., a stainless steel.

The measurement device 100 includes a measurement unit 13 secured in an opening of the process connector 3 such that a front surface 15 of the measurement unit 13 is facing into the container 1 when the measurement device is mounted on the container 1.

In certain embodiments, the measurement unit 13 is, e.g., flush mounted inside the opening in the connector body 5 of the process connector 3 such that the front surface 15 of the measurement unit 13 is in line with a front surface of the connector body 5 surrounding it. In an additional or alternative embodiment, the front surface 15 of the measurement unit 13 is, e.g., an substantially flat surface.

The measurement unit 13 includes a heat pipe 17 having two thermally conductive interfaces and a temperature sensor 19, and the measurement device 100 further includes a thermal insulation 21 surrounding the heat pipe 17 and the temperature sensor 19. The thermally conductive interfaces of the heat pipe 17 include a front interface 23 exposable to the temperature T to be measured and a second interface 25. The second interface 25 is in thermal contact with the temperature sensor 19. As an example, the temperature sensor 19 is, e.g., positioned and/or mounted on an outside surface of the second interface 25.

In the exemplary embodiment shown, the heat pipe 17 includes a hermetically closed tube 27, and the front interface 23 and the second interface 25 are located on opposite ends of the tube 27.

The heat pipe 17 includes a wicking structure 29, e.g., a sponge, a mesh or a capillary structure, covering an inside surface of the heat pipe 17. As an example, the wicking structure 29 may include or consist of sintered metal fibers. In certain embodiments, the wicking structure 29 may include grooves, e.g., machined grooves can be employed.

In addition, the heat pipe 17 is filled with a fluid F given by a liquid under partial pressure. This means that inside the heat pipe 17 a temperature-dependent fraction of the fluid F is in a liquid state and a temperature-dependent fraction of the fluid F is in a gaseous state.

Via the heat pipe 17, heat is transferred by cycles of phase transitions of the fluid F enclosed in the heat pipe 17. In each cycle, liquid fluid evaporates into vapor in evaporation areas inside the heat pipe 17, where the liquid is exposed to a temperature exceeding a boiling point of the fluid F. Due to the localized pressure increase associated with the evaporation, the vapor is distributed inside the heat pipe 17 and re-condenses into liquid in condensation areas inside the heat pipe 17, where a temperature of the vapor drops below the boiling point. Thus, the vapor transports the heat of vaporization consumed by the evaporating liquid in the evaporation areas to the condensation areas, where this energy is released in the form of latent heat of the condensing vapor. As a result, a fairly constant temperature is established throughout the interior of the heat pipe 17. An increase of the temperature inside the heat pipe 17 caused by thermal energy entering the heat pipe 17 causes a corresponding increase of the fraction of the fluid F in the gaseous state and a corresponding pressure increase inside the heat pipe 17. Conversely, a decrease of the temperature inside the heat pipe 17 caused by thermal energy leaving the heat pipe 17 causes a corresponding increase of the fraction of the fluid F in the liquid state and a corresponding pressure drop inside the heat pipe 17.

The present disclosure is not limited to the heat pipe 17 shown in FIG. 1. As an alternative another type of heat pipe can be used instead. Heat pipes are very efficient heat transfer devices for transferring heat from one thermally conductive interface to another based on the pressure and temperature driven cycles of phase transitions of the fluid enclosed in the heat pipe. As an example, heat pipes are frequently used in electronic devices for transporting heat generated by an electronic component, e.g., a central processing unit or a graphic card, away from the electronic component to prevent overheating.

Whereas heat pipes known in the prior art are normally used as unidirectional heat transfer devices, having a designated hot interface exposed to high temperatures and a designated cold interface, e.g., a cold interface exposed to a lower ambient temperature or subjected to active or passive cooling, the heat pipe 17 of the measurement device disclosed herein is employed as a bidirectional heat transfer device providing an essentially isothermal connection exposing the temperature sensor 19 in thermal contact with the second interface 25 to the temperature T to be measured that the front interface 23 is exposed to.

This is enabled by the high thermal conductivity of the heat pipe 17 and the thermal insulation 21 surrounding the heat pipe 13 and the temperature sensor 19. The thermal insulation 21 essentially prevents or at least drastically reduces a heat exchange between the heat pipe 13 and the temperature sensor 19 surrounded by the thermal insulation 21 and the process connector 3 surrounding the thermal insulation 21, as well as between the heat pipe 13 and the temperature sensor 19 surrounded by the thermal insulation 21 and the environment surrounding the process connector 3. Thus, assuming ideal insulation properties of the thermal insulation 21, heat can only be exchanged to and from the temperature sensor 19 via the front interface 23 of the heat pipe 17 exposed to the temperature T to be measured.

Operation of the measurement device is subsequently explained based on an example shown in FIG. 2, wherein the temperature T to be measured is illustrated as a function of time T(t) during three consecutive time intervals including a first time interval $\Delta t1$, during which the temperature T to be measured is constant, a second time interval $\Delta t2$, during which the temperature T to be measured increases in time t, and a third time interval $\Delta t3$, during which the temperature T to be measured decreases in time t.

During the first time interval $\Delta t1$, the front interface 23 is exposed to the constant temperature $T_0$. Due to the constant temperature $T_0$, the heat pipe 17 is in a state of thermal equilibrium, wherein the temperature of the second interface 25 is at least approximately equal to temperature of the front interface 23. Correspondingly, the temperature sensor 19 exposed to the temperature of the second interface 25 measures the constant temperature $T_0$ the front interface 23 is exposed to.

During the second time interval $\Delta t2$, the front interface 23 is heated by the rising temperature T to be measured. This leads to a corresponding increase of the amount of liquid in thermal contact with the front interface 23 that evaporates due to the heat supplied via the front interface 23. The liquid evaporating in the vicinity of the front interface 23 is indicated by the arrows E shown in FIG. 1. Due to the localized pressure increase associated with the localized evaporation the vapor is distributed inside the heat pipe 17 in a main direction of distribution directed towards the second interface 17 as indicated by the arrows V shown in FIG. 1. The distributed vapor re-condenses into liquid in condensation areas where its temperature drops below the boiling point of the fluid F as indicated by the arrows C in FIG. 1. Due to a temperature gradient along the heat pipe 13 caused by only the front interface 23 of the insulated heat pipe 17 being exposed to the rising temperature T condensation primarily takes place in condensation areas in the vicinity of the second interface 25. The re-condensed liquid is absorbed by the wicking structure 29. Within the wicking structure 29 adhesive and/or capillary forces cause the liquid to be fairly evenly redistributed throughout the entire wicking structure 29. In consequence, at least some of the re-condensed liquid is returned to the vicinity of the front interface 23 by the wicking structure 29 as indicated by the arrows R in FIG. 1. This returned liquid is then available again to absorb heat provided by the front interface 23, which will then again be transported towards the second interface 25 in form of vapor condensing in the vicinity of the second interface 25. As a result of these phase transition cycles, the temperature of the second interface 25 is driven by the temperature of the front interface 23 corresponding to the temperature T to be measured. Due to the extremely high thermal conductivity of the heat pipe 17, a time delay between the two temperatures is negligibly small.

During the third time interval $\Delta t3$, the direction of the heat transfer attained by the phase transition cycles described above is reversed. Due to the decreasing temperature T to be measured, the temperature of the front interface 23 decreases. When the temperature of the front interface 23 starts to drop, this causes the second interface 25 to be slightly hotter than the front interface 23. Because of the coexistence of the liquid and the vapor of the fluid inside the heat pipe 17, this leads to a corresponding increase of the amount of liquid evaporating in the vicinity of the second interface 25. Due to the localized pressure increase associated with this localized evaporation the vapor is distributed within the heat pipe 17 in a main direction of distribution directed towards the front interface 23. This vapor re-condenses into liquid in condensation areas where its temperature drops below the boiling point of the fluid. Due to the temperature gradient along the heat pipe 17 caused by only the front interface 23 of the insulated heat pipe 17 being exposed to the dropping temperature T condensation primarily takes place in condensation areas in the vicinity of the front interface 23. As a result, the latent heat released by the condensation is transferred into the container 1 via the front interface 23. Further, the re-condensed liquid is absorbed by the wicking structure 29 and at least some of the re-condensed liquid is returned to the second interface 25.

The devices of the present disclosure provide at least the advantages mentioned above. Individual components of the measurement device can be implemented in different ways without deviating from the scope of the present disclosure.

As an example, the heat pipe 17, or at least one of its components is, e.g., designed or selected based on a measurement range of temperatures T to be measured by the measurement device.

As an option, the tube 27 of the heat pipe 17, e.g., is made of a thermally conductive material, e.g., a metal, e.g., copper, steel, a nickel-alloy, aluminum or titanium. This provides the advantage that the front interface 23 and the second interface 25 can each be embodied as a wall section of the tube 27. As an example, the front interface 23 and the second interface 25 are, e.g., each defined by one of two end walls of the tube 27 located on opposite ends of the tube 27.

The fluid F enclosed in the heat pipe 17 is, e.g., selected based on the measurement range of the temperatures to be measured by the measurement device such that vapor and liquid coexist inside the heat pipe 17 over the entire measurement range. Examples are fluids including but not limited to pentane, ammonia, an alcohol or water. Each of these fluids is particularly well suited for a different temperature range. Thus, the fluid F or a combination of the fluid F and the type of wicking structure 29 employed is, e.g., selected based on the desired measurement range. By selecting the fluid F and/or the wicking structure 29 accordingly, the measurement range can be or is matched to the temperature range to be measured at the measurement site. As an example, a measurement range of −125° C. to 125° C. or a measurement range of −1° C. to 325° C. can be can be easily attained.

When extremely low temperatures are to be measured fluids, e.g., liquified gases, e.g., nitrogen, carbon dioxide or helium, can be employed.

Measurements of higher temperatures are e.g. accomplished by employing fluids, e.g., a fluid including a molten metal or a liquid metal alloy, e.g., bismuth, mercury, sodium, a sodium alloy, e.g., sodium potassium, indium or an eutectic gallium-indium-tin alloy. As another example a fluid having a lower boiling point can be employed under higher pressure.

With respect to the thermal insulation 21 various types of insulations can be employed.

FIG. 1 shows an example, wherein the thermal insulation 21 includes or consists of a thermally insulating material, e.g., a mineral oxide, a polymer or an aerogel, e.g., a microporous silica gel, a microporous glass or a zeolite.

Thermal insulations 21 including or consisting of an insulating material provide the advantage that these materials are available at low cost, that they can be easily cut into shape, and that they can be easily secured inside the opening of the process connector 3 or within the measurement unit 13, e.g. by gluing, sintering or mechanical packing.

The thermal insulation 21 is, e.g., configured as an individual component or as a part of the measurement unit 13. In the latter case, the measurement unit 13 including the thermal insulation 21 is e.g. embodied as an insert inserted in the connector body 5.

As additional or alternative option, the thermal insulation 21 is, e.g., a thermally insulating foam. As an example the foam is e.g. a foam attained by injecting a foam pre-product, e.g., a foam pre-product including a liquid stage blowing agent and a liquid polymer, e.g., isocyanate, water and polyurethane, and by letting the foam pre-product expand into the foam. As an example the foam pre-product is, e.g., injected into the opening of the connector body 5 or into an interior of the measurement unit 13 after the heat pipe 17 and the temperature sensor 19 have been installed.

This provides the advantage that the foam pre-product automatically expands into the insulating foam having the desired shape and that the expanding foam secures itself inside the opening or the measurement unit 13.

As an option, at least a front surface of the thermal insulation 21 facing into the container 1 when the measurement device is mounted on the container 1 is covered by a membrane 31. This provides the advantage that the membrane 31 prevents gases and liquids from entering the thermal insulation 21.

As an example, the membrane 31, e.g., extends across the front surface 15 of the measurement unit 13, the front surface of the thermal insulation 21 and the front surface of the connector body 5 surrounding the front surface 15 of the measurement unit 13. This provides the advantage that the membrane 31 can be easily mounted, e.g., welded, onto the process connector 3. Extending the membrane 31 across the front surface of the connector body 5 provides the additional advantage that essentially only the material of the membrane 31 comes into direct contact with any product or medium located inside the container 1. In this case a membrane material of the membrane 31 is, e.g., selected based on the requirements prevailing at the measurement site, e.g., requirements regarding hygiene, chemical and/or mechanical resistivity, chemical inertness, corrosion resistance and/or diffusion tightness.

The membrane 31 is, e.g., a metal membrane, e.g., a membrane consisting of stainless steel, titanium, a nickel-based alloy or tantalum, or a membrane, e.g., a metal membrane, having a coating, e.g., a corrosion resistant coating, on its outside surface. When the membrane 31 extends across the front surface 15 of the measurement unit 15 including the front surface of the front interface 23 of the heat pipe 17, the membrane 31 consists of a thermally conductive material, e.g., one of the metals mentioned above.

As an option, a thickness of the membrane 31 is, e.g., determined based on a compromise between the response time of the measurement device to temperature changes of the temperature T to be measured and a robustness, e.g., a mechanical robustness, an abrasion resistance and/or a corrosion resistance, of the membrane 31. In this respect, a thin membrane 31 provides the advantage of a short response time and a thicker membrane 31 provides the advantage of being more robust. As an option, the membrane 31 is, e.g., a thin membrane 31, e.g., a membrane 31 having a thickness smaller or equal to 2 mm, e.g., a thickness of 0.1 mm to 2 mm. This provides the advantage that due to the small thermal mass inherent to the thin membrane 31 a membrane temperature of the membrane 31 is approximately equal to the temperature T to be measured the membrane 31 is exposed to and that a time delay between a change of the temperature T to be measured and a corresponding change of the membrane temperature is short.

When the membrane 31 is in thermal contact with the process connector 3, reducing the thickness of the membrane 31 provides the additional advantage that it also reduces the amount of heat exchanged between the process connector 3 and the front interface 23 through the membrane 31 caused by temperature differences between the temperature of the process connector 3 and the temperature T to be measured.

On the other hand, in applications, where the membrane 31 is exposed to harsh conditions, a thickness larger or equal to 2 mm is e.g. applied. This increases the robustness of the membrane 31 at the expense of a correspondingly larger response time.

Figure 3:
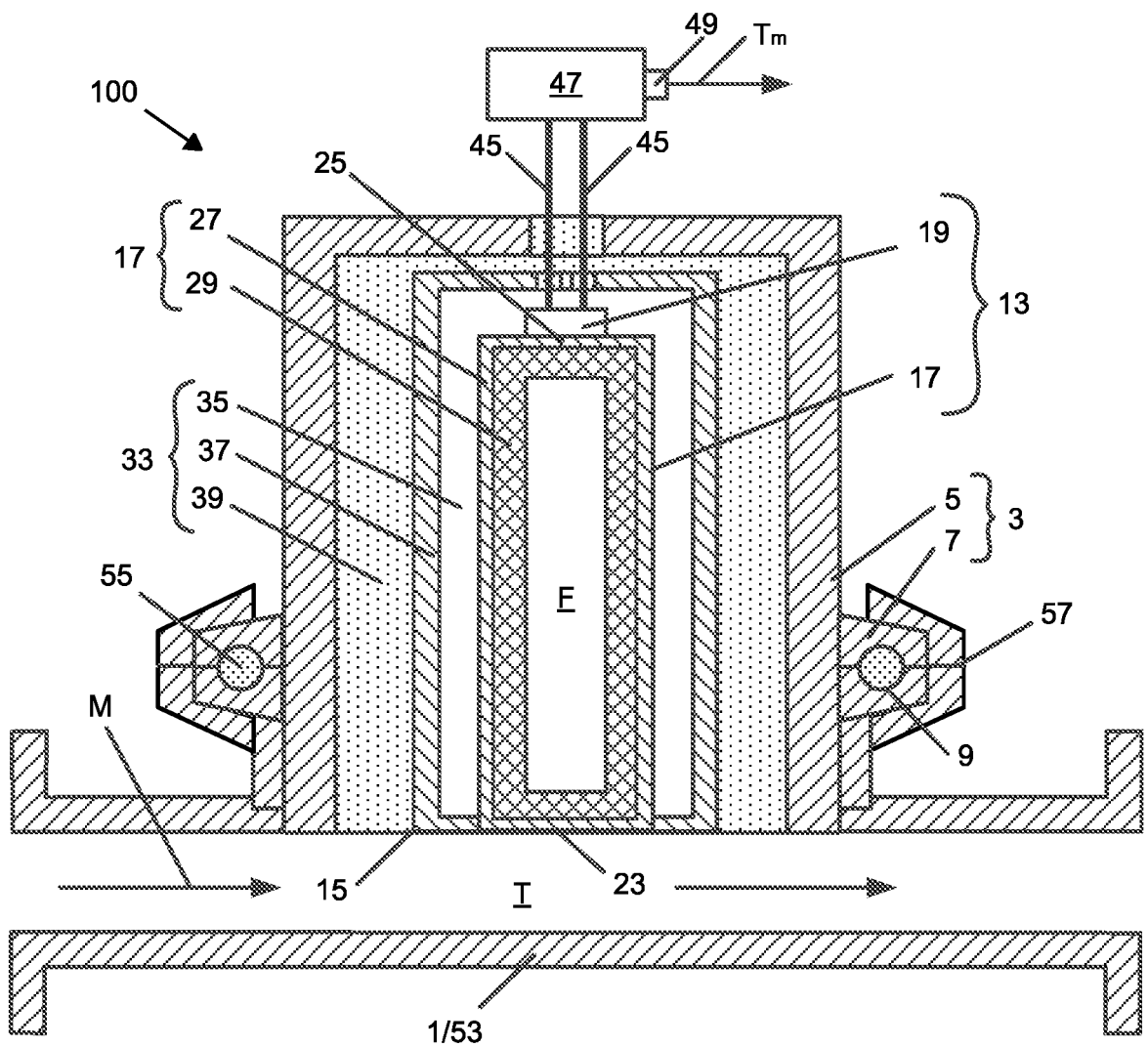
FIG. 3 shows a measurement device of the present disclosure including a vacuum chamber.

FIG. 3 shows another example of a measurement device, differing from the example shown in FIG. 1 in that the thermal insulation 33 surrounding the heat pipe 13 and the temperature sensor 19 includes a vacuum chamber 35. This vacuum chamber 35 surrounds the heat pipe 17 and the temperature sensor 19 such that only the front interface 23 of the heat pipe 17 is exposed to an outside of the vacuum chamber 35. As shown, the heat pipe 17 is, e.g., flush mounted inside the vacuum chamber 35 such that an outside surface of the front interface 23 is in line with a front surface of a section of a chamber wall 37 of the vacuum chamber 35 surrounding the front interface 23.

As an option the chamber wall 37 surrounding the vacuum chamber 35 is, e.g., a wall consisting of a material, e.g., steel, aluminum or a metal alloy.

As option, the thermal insulation 33 including the vacuum chamber 35 may additionally include a thermal insulator 39 providing a thermal insulation between the chamber wall 37 and the process connector 3. FIG. 3 shows an example, wherein the thermal insulator 39 consists of a thermally insulating material surrounding the chamber wall 37. The thermal insulator 39 is, e.g., an insulator including or consisting of a mineral oxide, a polymer, an aerogel, e.g., a microporous silica gel, a microporous glass or a zeolite, or the insulating foam described above in context with the thermal insulation 21 shown in FIG. 1.

The additional thermal insulator 39 provides the advantage that it reduces the amount of heat, that would otherwise be exchanged between the process connector 3 and the front interface 23 via the chamber wall 37 surrounding the front interface 23 when the temperature of the process connector 3 and the temperature of the front interface 23 are different.

Figure 2:
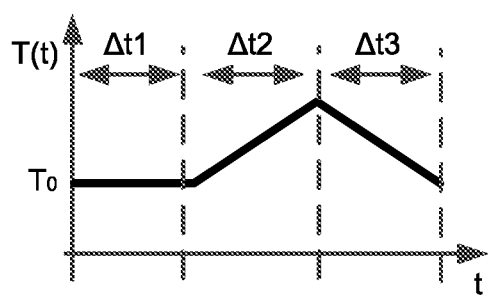
FIG. 2 shows an example application of a temperature to be measured.

Nonetheless, in particular due the thermal conductivity of the heat pipe 17 exceeding the thermal conductivity of the chamber wall 37 by orders of magnitude, accurate measurement results and short response times can also be achieved without the additional thermal insulator 39 shown in FIG. 2.

As an option, the membrane 31 described in context with the measurement device shown in FIG. 1 may also be foreseen in measurement devices including the vacuum chamber 35. In analogy to the previous example, this membrane 31, e.g., covers at least a front surface of the thermal insulator 39 or the front surface 15 of the measurement unit 13, the front surface of the thermal insulator 33 and the front surface of the connector body 5.

Figure 4:
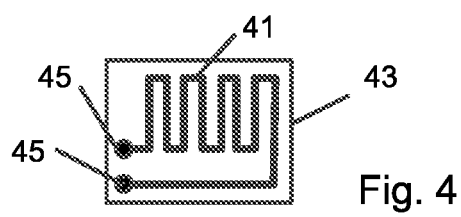
FIG. 4 shows a temperature sensor of the present disclosure.

With respect to the temperature sensor 19, temperature sensors known in the art, e.g., sensors including or consisting of at least one thermoelectric converter, e.g., at least one thermocouple or at least one resistance temperature detector, can be employed. An example is shown in FIG. 4. This temperature sensor 19 includes or consists of a temperature detector including an electrical conductor 41 deposited on a substrate 43. The electrical conductor 41 is, e.g., a wire or a conduction line consisting of a conductive material, e.g., platinum, copper or nickel having a temperature-dependent electrical resistance. The substrate 43 is, e.g., a ceramic substrate. This temperature sensor 19 is, e.g., positioned and/or mounted on the second interface 25 such that the electrical conductor 41 is in thermal contact with the second interface 25. As an option, each end of the electrical conductor 41 is connected to a connecting line 45 extending through the substrate 43.

Regardless of the number and the type of thermoelectric converter(s) employed, the temperature sensor 19 is e.g. connected to a sensor electronic 45 configured to measure at least one temperature-dependent electrical property of the thermoelectric converter(s), e.g., the temperature-dependent electrical resistance of the electrical conductor 41. As an example, the electrical resistance of the electrical conductor 41 is e.g. measured by a wheatstone bridge, including the electrical conductor 41 as one of the resistors of the bridge.

Further, the sensor electronic 47 is, e.g., configured to determine and to provide a measurement result Tm of the temperature T measured by the measurement device. The measurement result Tm is, e.g., provided in form of a measurement signal provided via a signal output 49 of the sensor electronic 45.

As an option, the sensor electronic 47 is, e.g., positioned outside the thermal insulation 21, 33, or outside the process connector 3. This provides the advantage that the sensor electronic 47 is protected from high temperatures, the temperature sensor 19 may be exposed to during measurement.

The measurement devices described herein can be applied at various different types of applications. FIG. 1 shows an example, wherein the measurement device is used to measure a temperature T inside the container 1, here given by a tank 51. FIG. 2 shows an example, wherein the measurement device is used to measure a temperature T of a medium M flowing through the container 1, e.g., the pipe 53 shown in FIG. 2.

Depending on the type of application, different types of process connectors 3 can be employed. In the examples shown, the fastener 7 and the counterpart 9 are embodied as complementary fasteners of a clamp fitting, wherein a gasket 55, e.g., an O-ring, to be inserted between the fastener 7 and the counterpart 9 is compressed by a clamp 57 shown in FIG. 2 embodied to clamp the fastener 7 onto the counterpart 9. Obviously another type of fastener 7 known in the art, e.g., a flange or a thread surrounding the connector body 5, can be employed instead.

As another option available regardless of the type of fastener employed, a position of the fastener 7 in relation to the front surface of the connector body 5 can be varied. In the example shown in FIG. 1, a front surface of the fastener 7 extends in line with the front surface of the connector body 5 of the process connector 3.

In the example shown in FIG. 2 the front surface of the fastener 7 is set back from the front surface of the connector body 5. Correspondingly, the connector body 5, as well as the measurement unit 13 secured in the opening of the connector body 5 protrude in front of the front surface of the fastener 7. By dimensioning or adjusting a distance between the front surface of the fastener 7 of the process connector 3 and the front surface of the connector body 5 accordingly this provides the advantage that a front section of the connector body 5 can be inserted into the opening 11 of the container 1 such that the front surface of the connector body 5 is in line with an inside wall surface of the container 1 as shown in FIG. 2.

Figure 5:
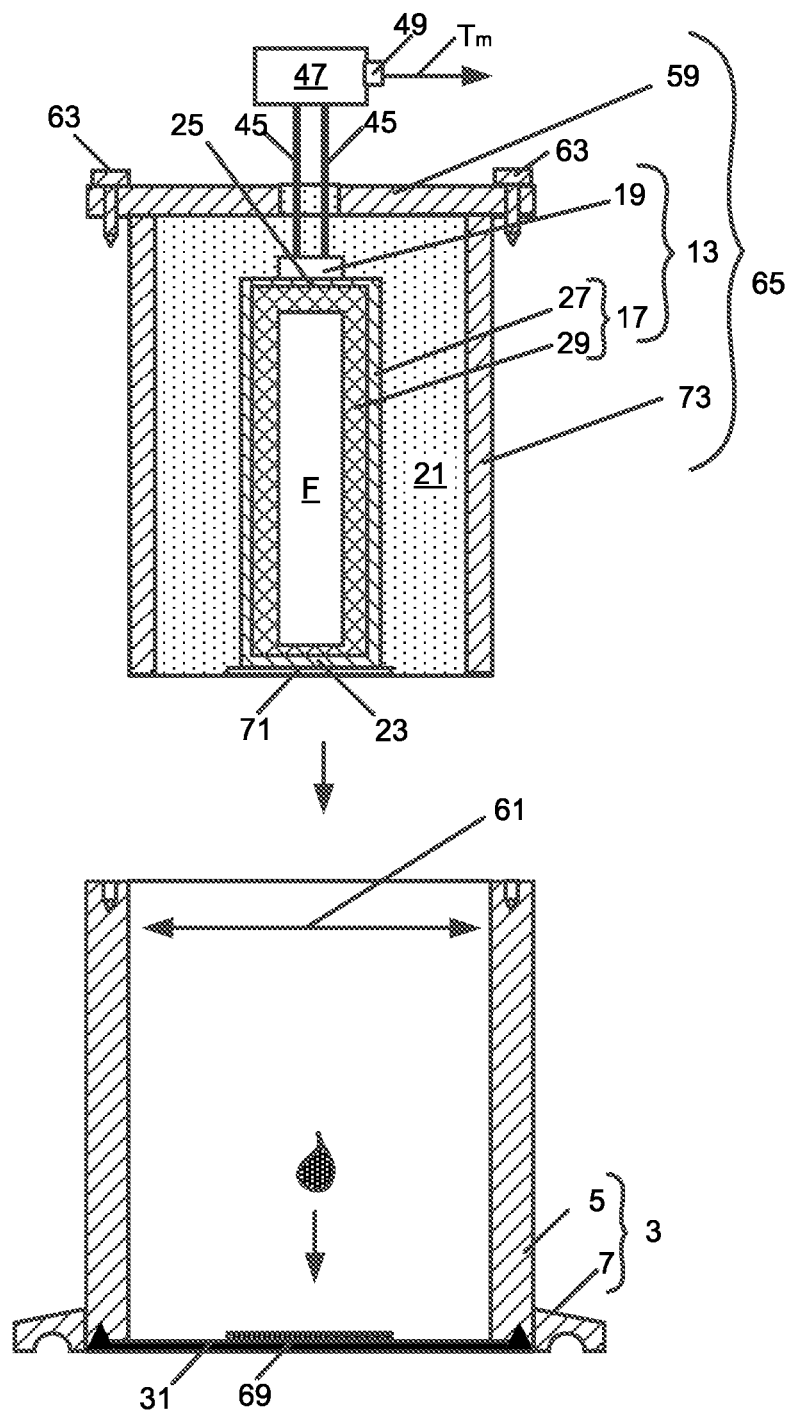
FIG. 5 shows a measurement device of the present disclosure including a replaceable measurement unit.
Figure 6:
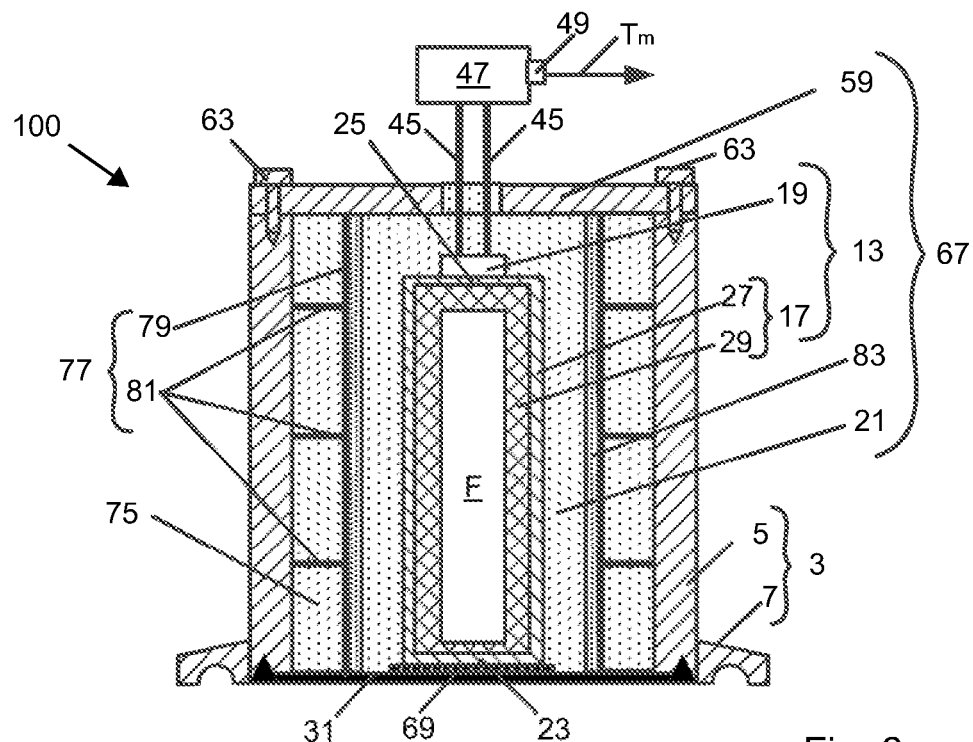
FIG. 6 shows a measurement device of the present disclosure including a replaceable measurement unit and an outer insulation.
Figure 7:
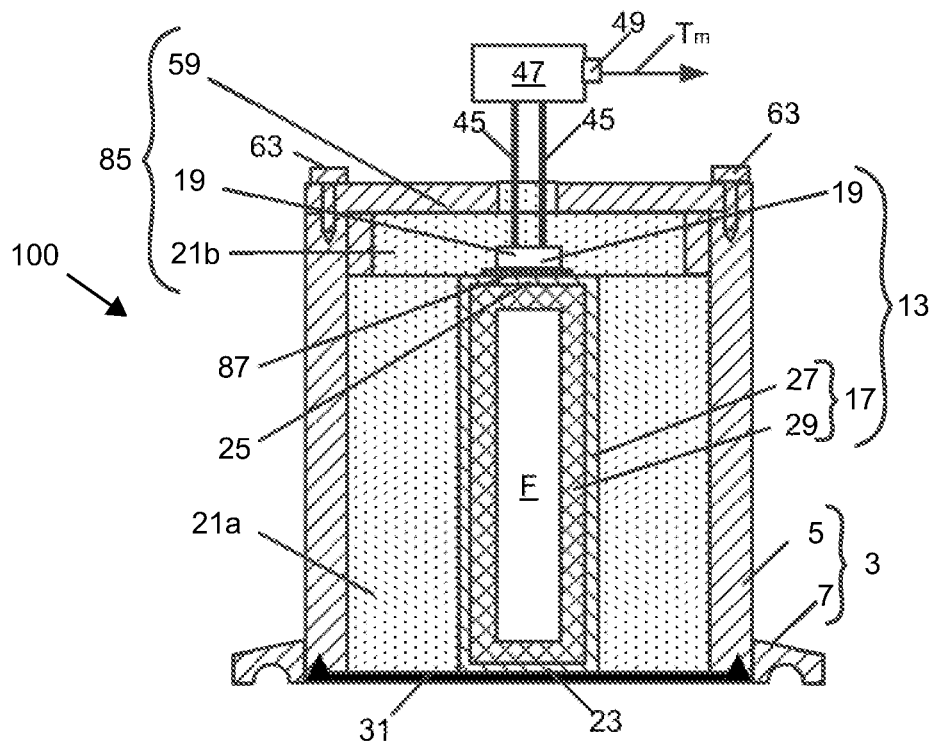
FIG. 7 shows a measurement device of the present disclosure including a replaceable temperature sensor.

As an additional or alternative option, the measurement device is, e.g., embodied such that at least one of: the temperature sensor 13, the heat pipe 17 and the measurement unit 13 is replaceable. Examples are shown in FIGS. 5, 6 and 7.

Replaceability of the temperature sensor 19, the heat pipe 17 and/or the entire measurement unit 13 is especially advantageous in applications, where the measurement device is exposed to harsh conditions, e.g., extremely rapid temperature changes and/or extremely large temperature changes, that may lead to a shortened operating time of the heat pipe 17, the temperature sensor 19 and/or the measurement unit 13.

As shown, replaceability is, e.g., attained by the measurement device including a releasably connected cover 59 covering an opening 61 of the measurement device such that at least one of the temperature sensor 19, the heat pipe 17 and the measurement unit 13 is exchangeable through the opening 61. As an example the cover 59 is, e.g., releasably connected to the connector body 5 and covers the opening 61 of the process connector 3 connected to an interior of the connector body 5. As illustrated in the examples shown, the cover 59 is, e.g., located on a rear side of the process connector 5 facing away from the front surface of the measurement unit 13. In the examples shown, the cover 59 is releasably connectable to the connector body 5 by fasteners 63, e.g., the screws shown or other types of fasteners known in the art. The releasably connected cover 59 provides the advantage that the temperature sensor 19, the heat pipe 17 and/or the entire measurement unit 13 located inside the connector body 5 can be accessed and correspondingly also replaced through the opening 61 of the process connector 3 by removing the cover 59. An additional advantage is that the replacement can be performed, whilst the process connector 3 remains mounted on the container 1.

As an option, the cover 59 is embodied as a component of a module releasably connected to the connector body 5. In this case the module includes the cover 59 and at least one replaceable component of the measurement device.

In the examples shown in FIGS. 5 and 6, the modules 65, 67 each include the cover 59 and the measurement unit 13. In these examples, the modules 65, 67 or the measurement units 13 additionally include the thermal insulation 21 surrounding the heat pipe 17 and the temperature sensor 19. As an example, the modules 65, 67 are, e.g., each embodied as an insert, inserted into the connector body 5 through the rear opening 61 of the connector body 5.

As an option, measurement devices including replaceable measurement units 13, e.g., the measurement device shown in FIGS. 5 and 6, e.g., include the membrane 31 extending across the front surface 15 of the measurement unit 13, the front surface of the thermal insulation 21 and the front surface of the connector body 5. As shown, the membrane 31 is connected to, e.g., welded onto, the process connector 3.

In combination with the replaceable measurement unit 13, the membrane 31 provides the advantage that it separates the inside of the container 1 from the surrounding of the container 1, when the module 65, 67 is removed whilst the connector body 5 remains in place at the measurement site. Thus, the measurement unit 13 or the module 65, 67 can be replaced without causing any disruption at the measurement site.

As an option, the measurement device including the membrane 31 and the replaceable measurement unit 13, e.g., includes a layer 69 of a heat conducting thermal paste positioned between the front interface 23 of the heat pipe 17 and the membrane 31.

The layer 69 is, e.g., a layer consisting of thermally conductive paste, a layer consisting of an electrically insulating thermally conductive paste or a layer consisting of a paste including or consisting of a resin, an epoxy or a silicon based material, e.g., silicon containing at least one thermally conductive filler, e.g., a metal powder, a metal oxide or a metal nitride.

As an example, the layer 69 is, e.g., a layer filling a recess 71 of the module 65, 67 exposing the front interface 23 of the heat pipe 23. The layer 69 provides the advantage that it increases the heat exchange rate of heat exchanged between the membrane 31 and the front interface 23 of the heat pipe 17. As indicated in FIG. 5, the layer 69 is e.g. attained by dispensing a predetermined amount of the thermal paste onto a center of an inner side of the membrane 31, which will then distribute into the layer 69 filling the recess 71, when the module 65, 67 is mounted on the connector body 5.

As an option shown in FIG. 5, the module 65, e.g., includes a module wall 73 surrounding the thermal insulation 21 surrounding the heat pipe 17 and the temperature sensor 19. This module wall 73 increases the flexibility with respect to the choice of the type of thermal insulation 21 applied and protects the thermal insulation 21 during insertion into the connector body 5.

The example shown in FIG. 6 differs from the example shown in FIG. 5, in that this measurement device additionally includes an outer thermal insulation 75 surrounding an inner thermal insulation given by the thermal insulation 21 surrounding the heat pipe 17 and temperature sensor 19. The outer thermal insulation 75 is located inside the connector body 5 and can be employed to increase the total insulation provided by both the inner thermal insulation 21 and the outer thermal insulation 75 and/or to reduce the size of the inner thermal insulation 21 and correspondingly also the size of the module 67 including the inner thermal insulation 21.

As an option shown in FIG. 6, a mechanical structure 77 mechanically supporting the membrane 31 is, e.g., located in an area of an interior of the connector body 5 surrounding the measurement unit 13.

Supporting the shape of the membrane 31 provides the advantage that it makes the membrane 31 more robust, with respect to forces, e.g., forces due to a pressure and/or due to pressure changes inside the container 1, during replacement of the measurement unit 13, as well as when the module 67 is removed and/or replaced.

The mechanical structure 77 shown in FIG. 6 includes a tube 79 covering an inside surface of the outer insulation 75 and elongated extensions 81 distributed along an outer circumference of the tube 79, each extending from the tube 79 of the mechanical structure 77 through the outer thermal insulation 75 to an inside surface of the connector body 5. The tube 79 facilitates the insertion of the module 67. In addition, the combination of the tube 79 and the extensions 81 supports the shape membrane 31 as well as the shape of the outer thermal insulation 75. Supporting the shape of the outer thermal insulation 75 provides more flexibility regarding the choice of the type of additional thermal insulation 75 that can be employed.

As an alternative other mechanical structures supporting the membrane 31 and/or supporting the shape of the outer thermal insulation 75 can be employed instead.

Regardless of the type of mechanical structure employed, the mechanical structure 77, e.g., includes a thermally insulating material, e.g., a metal having a low thermal conductivity, a ceramic or a rigid plastic. This provides the advantage that it reduces the amount of heat exchanged to and from the measurement unit 13 via the mechanical structure 77.

As an option, the module 67 shown in FIG. 6 may additionally include a module wall 83 surrounding the inner thermal insulation 21. In this case, the module wall 83, e.g., consists of a thermally insulating material, a metal having a low thermal conductivity, a ceramic or a rigid plastic.

In the example shown in FIG. 7 the detachably mounted module 85 includes the cover 59 and the temperature sensor 19. Thus, by removing the module 85, the entire module 85 or the temperature sensor 19 included in the module 85 can be replaced.

To this extent, the thermal insulation 21 surrounding the heat pipe 13 and the temperature sensor 19 includes a first insulation 21a surrounding the heat pipe 13 inside the connector body 5 and a separate second insulation 21b surrounding the temperature sensor 19 inside the module 85.

As an option, the measurement device including the replaceable temperature sensors 19, e.g., includes a layer 87 of a heat conductive thermal paste positioned between the second interface 25 of the heat pipe 13 and the temperature sensor 19. The layer 87 is, e.g., a layer including an electrically insulating, thermally conductive paste and/or a layer including a paste including or consisting of a resin, an epoxy or a silicon based material, e.g., silicon containing at least one thermally conductive filler, e.g., a metal powder, a metal oxide or a metal nitride.

As an example, the layer 87 is, e.g., a layer essentially filling a recess of the module 85 exposing a front side of the temperature sensor 19 facing towards the second interface 25 of the heat pipe 17. The layer 87 of thermal paste provides the advantage that it increases the heat exchange rate of heat exchanged between the second interface 25 of the heat pipe 13 and the temperature sensor 19.

The invention claimed is:

1. A measurement device for measuring a temperature prevailing inside a container, the measurement device comprising:
a process connector including a connector body and a fastener configured to be mounted onto a corresponding counterpart surrounding an opening of the container;
a measurement unit secured in an opening of the process connector such that, when the measurement device is mounted on the container via the process connector, a front surface of the measurement unit is opposite to the opening of the container and facing into the container, wherein the measurement unit includes a heat pipe and a temperature sensor, the heat pipe including two thermally conductive interfaces, including a front interface exposable to the temperature to be measured inside the container and a second interface in thermal contact with the temperature sensor; and
a thermal insulation surrounding the heat pipe and the temperature sensor.

2. The measurement device of claim 1, wherein:
the heat pipe includes a tube made of a thermally conductive material, a metal, copper, steel, a nickel alloy, aluminum, or titanium; and
the front interface and the second interface are located on opposite ends of the tube or are each given by one of two end walls of the tube located on opposite ends of the tube.

3. The measurement device of claim 1, wherein the measurement unit is flush mounted inside the opening of the process connector such that the front surface of the measurement unit is in line with a front surface of the connector body.

4. The measurement device of claim 1, wherein the thermal insulation includes or is made of a thermally insulating material, a mineral oxide, a polymer, an aerogel, a microporous silica gel, a microporous glass, a zeolite, an insulating foam or an insulating foam attained by injecting a foam pre-product, a foam pre-product including a liquid stage blowing agent and a liquid polymer or a foam pre-product including isocyanate, water and polyurethane, and by letting the foam pre-product expand into the foam.

5. The measurement device of claim 1, wherein the temperature sensor:
is a sensor including or made of at least one thermoelectric converter, at least one thermocouple, or at least one resistance temperature detector; and/or
is connected to a sensor electronic, to a sensor electronic disposed outside the thermal insulation, or to a sensor electronic disposed outside the process connector; and
the sensor electronic is configured to determine and to generate a measurement result of the temperature measured by the temperature sensor.

6. The measurement device of claim 1, wherein:
a front surface of the fastener extends in line with a front surface of the connector body;
the connector body protrudes in front of a front surface of the fastener; or
the connector body protrudes in front of a front surface of the fastener such that the front surface of the connector body is in line with an inside wall surface of the container when the measurement device is mounted on the container.

7. The measurement device of claim 1, wherein the heat pipe:
includes a wicking structure covering an inside surface of the heat pipe; and
is filled with a fluid given by a liquid under partial pressure.

8. The measurement device of claim 7, wherein:
the fluid is or includes at least one of pentane, water, ammonia, alcohol, water, helium, nitrogen, carbon dioxide, bismuth, mercury, sodium, a sodium alloy, sodium potassium, indium, an eutectic gallium-indium-tin alloy, a fluid including a liquified gas, a fluid including a molten metal and a fluid including a liquid metal alloy; and/or
the wicking structure is or includes a sponge, a mesh, a capillary structure, sintered metal fibers or a structure including grooves or machined grooves.

9. The measurement device of claim 1, wherein:
the thermal insulation includes a vacuum chamber surrounding the heat pipe and the temperature sensor such that only the front interface of the heat pipe is exposed to an outside of the vacuum chamber; or
the heat pipe is flush mounted inside the vacuum chamber such that an outside surface of the front interface of the heat pipe is in line with a front surface of a section of a chamber wall of the vacuum chamber surrounding the front interface.

10. The measurement device of claim 9, further comprising a thermal insulator configured to provide a thermal insulation between a chamber wall surrounding the vacuum chamber and the process connector, wherein the thermal insulator:
- includes or is made of a thermally insulating material, an aerogel, a microporous silica gel, a microporous glass, a zeolite, an insulating foam or an insulating foam attained by injecting a foam pre-product, a foam pre-product including a liquid stage blowing agent and a liquid polymer or a foam pre-product including isocyanate, water and polyurethane, and by letting the foam pre-product expand into the foam; and
- surrounds the chamber wall of the vacuum chamber.

11. The measurement device of claim 1, further comprising a membrane, the membrane covering:
- a front surface of the thermal insulation, which faces into the container when the measurement device is mounted on the container; or
- the front surface of the measurement unit, the front surface of the thermal insulation and a front surface of the connector body.

12. The measurement device of claim 11, wherein the membrane:
- is made of a thermally conductive material, a metal, a stainless steel, titanium, a nickel-based alloy or tantalum;
- is a membrane or a metal membrane having a coating or a corrosion resistant coating on an outside surface thereof; and/or
- has a thickness smaller or equal to 2 mm or a thickness of 0.1 mm to 2 mm.

13. The measurement device of claim 1, further comprising a releasably connected cover covering an opening of the measurement device such that at least one of: the temperature sensor, the heat pipe, and the measurement unit is exchangeable through the opening of the measurement device.

14. The measurement device of claim 13, wherein:
- the thermal insulation surrounding the heat pipe and the temperature sensor includes a first insulation surrounding the heat pipe and a separate second insulation surrounding the temperature sensor; and
- the measurement device includes a detachably mounted module including the cover, the temperature sensor, and the second insulation.

15. The measurement device of claim 14, wherein:
- a layer of a thermal paste is disposed between the temperature sensor and the second interface of the heat pipe; and the layer is made of:
  - a thermally conductive paste;
  - an electrically insulating and thermally conductive paste; or
  - a paste comprising a resin, an epoxy, or a silicon-based material.

16. The measurement device of claim 15, wherein the silicon-based material comprises at least one thermally conductive filler, comprising a metal powder, a metal oxide, or a metal nitride.

17. The measurement device of claim 13, further comprising a detachably mounted module including the cover and the measurement unit.

18. The measurement device of claim 17, further comprising at least one of:
- a membrane connected to the process connector such that the membrane covers a front surface of the measurement unit, a front surface of the thermal insulation, and a front surface of the connector body;
- a layer of thermal paste disposed between the membrane and the front interface of the heat pipe, wherein the layer is made of:
  - a thermally conductive paste;
  - an electrically insulating and thermally conductive paste; or
  - a paste comprising a resin, an epoxy, or a silicon-based material;
- an outer thermal insulation surrounding an inner thermal insulation, wherein the outer thermal insulation is disposed inside the connector body and wherein the inner thermal insulation is given by the thermal insulation surrounding the heat pipe and the temperature sensor; and
- a mechanical structure disposed in an interior volume of the connector body, which interior volume surrounds the measurement unit, wherein the mechanical structure is made of:
  - a thermally insulating material;
  - a metal having a low thermal conductivity;
  - a ceramic; or
  - a rigid plastic, and
  wherein the mechanical structure:
  - is configured to mechanically support at least one of the membrane and a shape of the outer thermal insulation; and/or
  - includes a tube and elongated extensions distributed along an outer circumference of the tube, wherein each extension extends from the tube to an inside surface of the connector body.

19. The measurement device of claim 18, wherein the silicon-based material comprises at least one thermally conductive filler, comprising a metal powder, a metal oxide, or a metal nitride.

* * * * *